US010937111B2

(12) United States Patent
Bharti et al.

(10) Patent No.: US 10,937,111 B2
(45) Date of Patent: Mar. 2, 2021

(54) MANAGING ENERGY PURCHASE AGREEMENTS ON A BLOCKCHAIN

(71) Applicant: INTERNATIONAL BUSINESS MACHINES CORPORATION, Armonk, NY (US)

(72) Inventors: Harish Bharti, Pune (IN); Abhay K. Patra, Pune (IN); Rajesh K. Saxena, Mumbai (IN); Deependra K. Singh, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 493 days.

(21) Appl. No.: 15/824,411

(22) Filed: Nov. 28, 2017

(65) Prior Publication Data
US 2019/0165931 A1 May 30, 2019

(51) Int. Cl.
*G06Q 50/06* (2012.01)
*H04L 9/06* (2006.01)
(Continued)

(52) U.S. Cl.
CPC ......... *G06Q 50/06* (2013.01); *G06Q 20/0658* (2013.01); *G06Q 50/18* (2013.01); *H02J 3/008* (2013.01); *H04L 9/0637* (2013.01); *H04L 9/3239* (2013.01); *H04L 9/3297* (2013.01); *H04L 67/104* (2013.01); *H04L 2209/38* (2013.01)

(58) Field of Classification Search
CPC .............................. G06Q 50/06; H04L 9/0637

USPC ........................................................ 705/412
See application file for complete search history.

(56) References Cited

U.S. PATENT DOCUMENTS 9,774,578 B1 * 9/2017 Ateniese ............... H04L 9/3221
2003/0009401 A1 * 1/2003 Ellis ................... G06Q 30/0283
705/35
(Continued)

OTHER PUBLICATIONS

Enerquire.com, "Blockchain in the energy sector: Institutional disruption?", available at: https://www.enerquire.com/blog/blockchain-in-the-energy-sector-the-institutional-side, last accessed Oct. 17, 2020, (Year: 2017).*
(Continued)

*Primary Examiner* — Kevin H Flynn
*Assistant Examiner* — Emmett K. Walsh
(74) *Attorney, Agent, or Firm* — Law Offices of Ira D. Blecker, P.C.

(57) ABSTRACT

A computer-implemented method of managing energy supply agreements that includes: connecting to a permissioned blockchain, the blockchain being accessible only by energy suppliers, energy transmission companies and government agencies that regulate a market for the supply of energy by energy suppliers to energy transmission companies; creating a new block for an energy purchase agreement that provides for the purchase of energy by an energy transmission company from an energy supplier; appending the new block having the energy purchase agreement to the blockchain; and responsive to the energy supplier supplying a quantity of energy to the energy transmission company in an individual energy transaction, appending the individual energy transaction as a block to the blockchain.

14 Claims, 6 Drawing Sheets

(51) Int. Cl.
   *H02J 3/00* (2006.01)
   *H04L 29/08* (2006.01)
   *G06Q 20/06* (2012.01)
   *G06Q 50/18* (2012.01)
   *H04L 9/32* (2006.01)

(56) References Cited

U.S. PATENT DOCUMENTS

| | | | |
|---|---|---|---|
| 2007/0219819 A1* | 9/2007 | Campbell | G06Q 10/10 |
| | | | 705/35 |
| 2010/0161399 A1* | 6/2010 | Posner | G06Q 30/02 |
| | | | 705/14.13 |
| 2016/0260171 A1 | 9/2016 | Ford et al. | |
| 2016/0284033 A1 | 9/2016 | Winand et al. | |
| 2017/0103468 A1* | 4/2017 | Orsini | G06Q 40/12 |
| 2017/0206522 A1* | 7/2017 | Schiatti | G06Q 50/06 |
| 2017/0358041 A1* | 12/2017 | Forbes, Jr. | G06Q 20/102 |
| 2018/0182048 A1* | 6/2018 | Stocker | H04L 67/104 |
| 2018/0183600 A1* | 6/2018 | Davis | H04L 9/3239 |

OTHER PUBLICATIONS

"Blockchain—an Opportunity for Energy Producers and Consumers?", PWC Global Power & Utilities, 2016, all pages.

Tai Xue et al., "Electricity Transactions and Congestion Management Based on Blockchain in Energy Internet", Power System Technology 2016, vol. 40 Issue (12): 3630-3638, all pages.

Michael Del Castillo, "New York's 'Energy Czar' Talks Future of Blockchain for Energy Grids", [online], [retrieved on Sep. 5, 2017], Retrieved from the Internet <URL: https://www.coindesk.com/new-york-energy-czar-blockchain/>, all pages.

Kevin Delmolino et al., "Step by Step Towards Creating a Safe Smart Contract: Lessons and Insights from a Cryptocurrency Lab", Nov., 18, 2015, Retrieved from the Internet <URL: https://eprint.iacr.org/2015/460.pdf>, all pages.

John Ream et al., "Upgrading blockchains Smart contract use cases in industry", Jun. 8, 2016, [online], [retrieved on Sep. 5, 2017], Retrieved from the Internet <URL: https://dupress.deloitte.com/dup-us-en/focus/signals-for-strategists/using-blockchain-for-smart-contracts.html>, all pages.

* cited by examiner

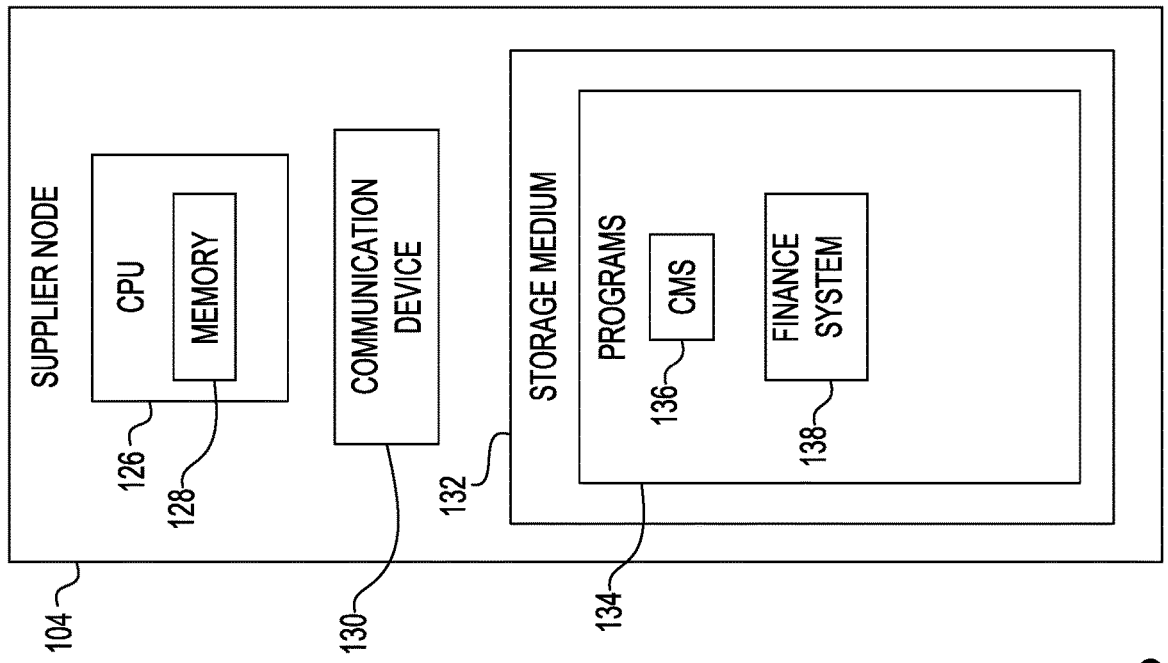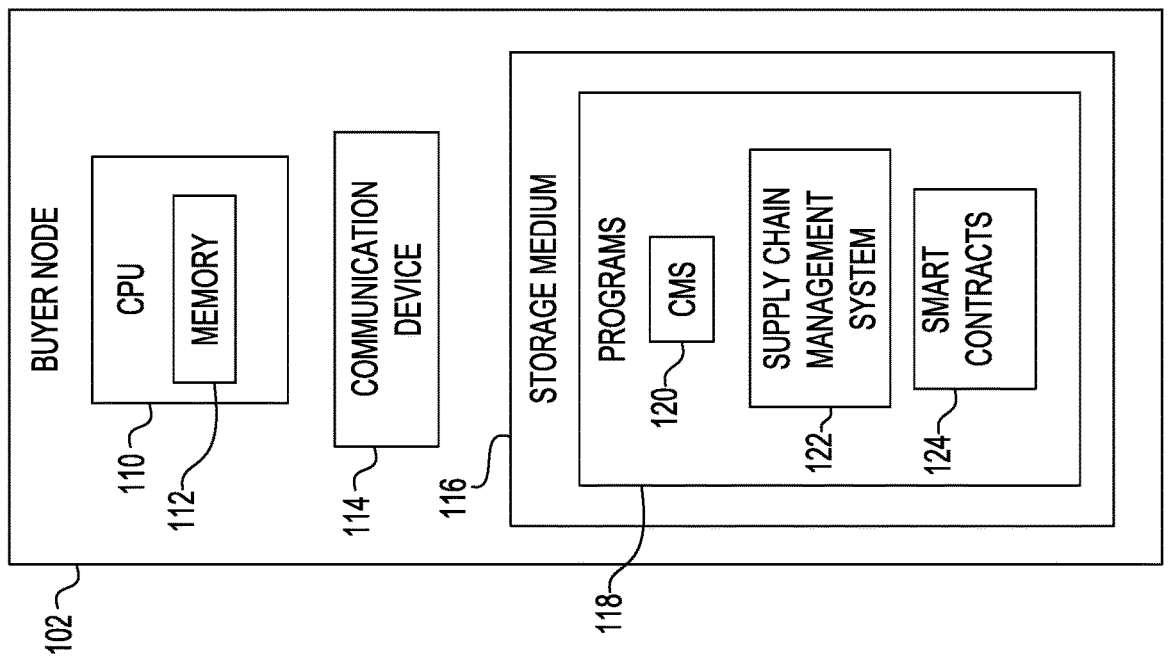
FIG. 2

MANAGING ENERGY PURCHASE AGREEMENTS ON A BLOCKCHAIN

BACKGROUND

The present exemplary embodiments pertain to secure distributed transaction ledgers, also called blockchains, and more particularly using blockchains to manage supply agreements between energy suppliers and energy transmission companies.

In the utility industry, all energy transmission companies forecast their energy demands and engage energy suppliers to get enough supply of energy for future distribution. Energy transmission companies negotiate and secure energy purchase agreements with energy suppliers to cover energy demand at agreeable tariffs to avoid any load shedding, poor load factor and peak load demand.

In a connected but highly decentralized world, the energy suppliers would have energy purchase agreements that might be double spread between various energy transmission companies and this increases the risk of defaults. Double spread here means that the energy supplier has committed more capacity of energy than the energy supplier has the capacity to deliver to two or more energy transmission companies. Default here is defined as a supplier showing preference to one energy transmission company over another and thus leaving an energy transmission company exposed by failing to supply the full amount of energy that was agreed to in the energy purchase agreement.

BRIEF SUMMARY

The various advantages and purposes of the exemplary embodiments as described above and hereafter are achieved by providing, according to an aspect of the exemplary embodiments, a computer-implemented method of managing energy supply agreements comprising: connecting to a permissioned blockchain, the blockchain being accessible only by energy suppliers, energy transmission companies and government agencies that regulate a market for the supply of energy by energy suppliers to energy transmission companies; creating a new block for an energy purchase agreement that provides for the purchase of energy by an energy transmission company from an energy supplier; appending the new block having the energy purchase agreement to the blockchain; and responsive to the energy supplier supplying a quantity of energy to the energy transmission company in an individual energy transaction, appending the individual energy transaction as a block to the blockchain.

According to another aspect of the exemplary embodiments, there is provided a computer program product for managing energy supply agreements comprising a non-transitory computer readable storage medium having program instructions embodied therewith, the program instructions executable by a computer to cause the computer to perform a method comprising: connecting to a permissioned blockchain, the blockchain being accessible only by energy suppliers, energy transmission companies and government agencies that regulate a market for the supply of energy by energy suppliers to energy transmission companies; creating a new block for an energy purchase agreement that provides for the purchase of energy by an energy transmission company from an energy supplier; appending the new block having the energy purchase agreement to the blockchain; responsive to the energy supplier supplying a quantity of energy to the energy transmission company in an individual energy transaction, appending the individual energy transaction as a block to the blockchain.

According to a further aspect of the exemplary embodiments, there is provided a system for managing energy supply agreements comprising: a permissioned blockchain, the blockchain being accessible only by energy suppliers, energy transmission companies and government agencies that regulate a market for the supply of energy by energy suppliers to energy transmission companies; a non-transitory storage medium that stores instructions; a computer that executes the instructions to perform the following functions: create a new block for an energy purchase agreement that provides for the purchase of energy by an energy transmission company from an energy supplier; append the new block having the energy purchase agreement to the blockchain; responsive to the energy suppliers supply of a quantity of energy to the energy transmission company in an individual energy transaction, append the individual energy transaction as a block to the blockchain.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 2 illustrates exemplary embodiments of a buyer node and a supplier node in the distributed peer-to-peer network.

DETAILED DESCRIPTION

Figure 1:
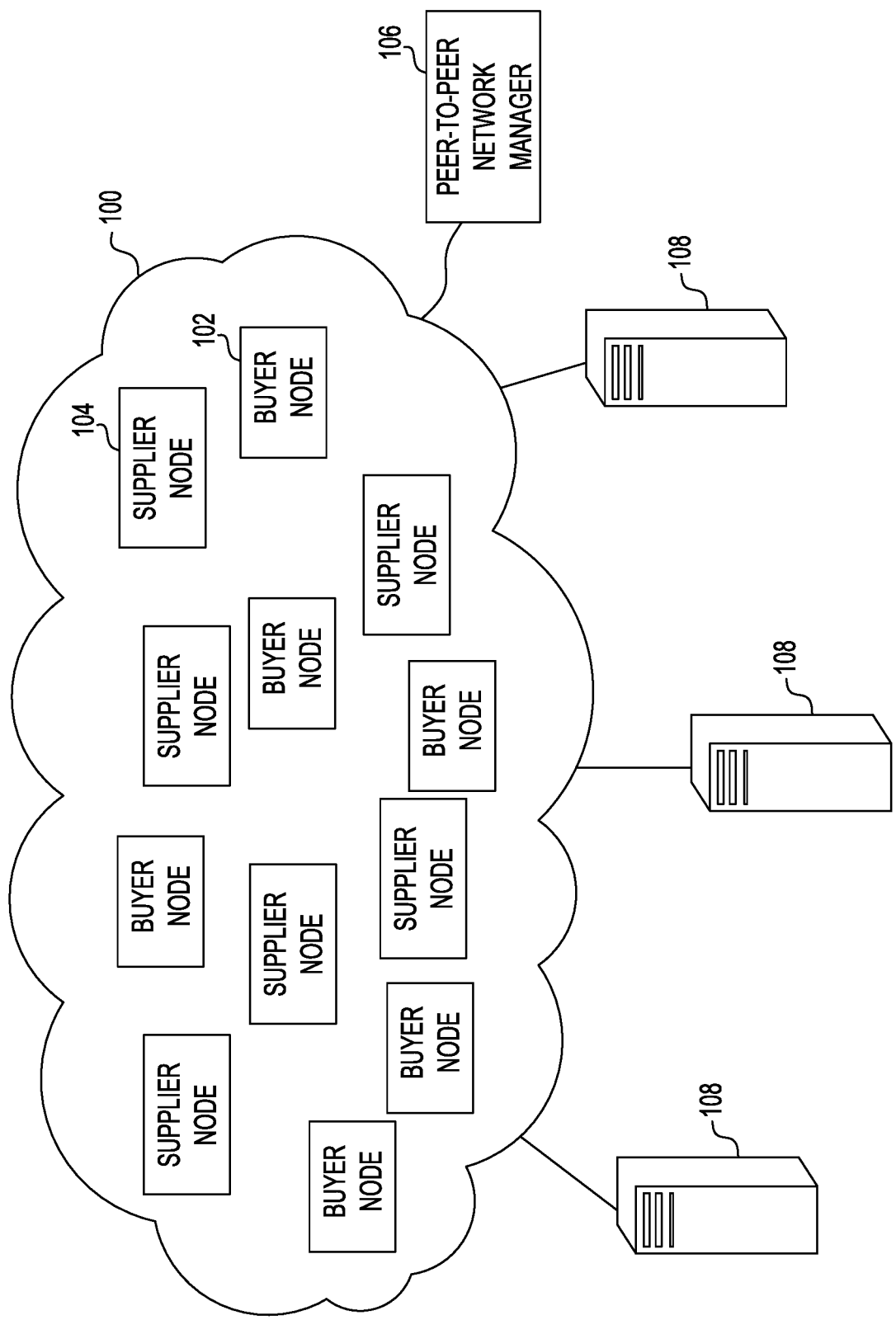
FIG. 1 illustrates an embodiment of a distributed peer-to-peer network.

The present inventors propose a framework to analyze the energy agreements and the purchase transactions, so that the energy transmission company can identify the energy suppliers who are willful defaulters against the agreement and are selling surplus energy to other buyers.

The framework may provide the following:
- a secured way of recording information of energy purchase agreements and energy purchase transactions;
- an automated routine that records the physical energy transaction in the blockchain through a smart contract as part of the end of day settlement process by the transmission company; and
- provide the ability to energy transmission companies to ascertain highly reliable energy suppliers from the rest of the pool of energy suppliers and provide the ability to energy transmission companies to quickly ascertain less reliable suppliers from the rest of the pool of energy suppliers.

A blockchain is a continuously growing list of records, called blocks, which are linked and secured using cryptography. Each block contains typically a hash pointer as a link to a previous block, a timestamp and transaction data. By design, blockchains are inherently resistant to modification of the data. Functionally, a blockchain can serve as an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks and a collusion of the network majority.

Blockchains are secure by design.

The first distributed blockchain was conceptualised by Satoshi Nakamoto in 2008 and implemented the following year as a core component of the digital currency bitcoin, where it serves as the public ledger for all transactions. The invention of the blockchain for bitcoin made it the first digital currency to solve the double spending problem, without the use of a trusted authority or central server.

Smart contracts represent a next step in the progression of blockchains from a financial transaction protocol to an all-purpose utility. They are pieces of software, not contracts in the legal sense, that extend blockchains' utility from simply keeping a record of financial transaction entries to automatically implementing terms of multiparty agreements. Smart contracts are executed by a computer network that uses consensus protocols to agree upon the sequence of actions resulting from the contract's code. The result is a method by which parties can agree upon terms and trust that they will be executed automatically, with reduced risk of error or manipulation.

According to the exemplary embodiments, there is disclosed a framework to manage energy purchase agreements on secure distributed transaction ledgers to enable enhanced visibility and control. Such secure distributed transaction ledgers are hereafter referred to a blockchains.

One aspect of the framework enables enables utilization of blockchain technology to develop a centrally managed blockchain that is used by energy transmission companies to write all energy agreements and transactions as blocks in the shared ecosystem.

Another aspect of the framework is to provide a mechanism for every energy purchase agreement to be appended as a block on the blockchain. Each block on the blockchain provides key information on the energy purchase agreement such as energy transmission company, energy supplier and energy supplier energy capacity. Certain financial information may be included in the block but is hidden from all but parties to the energy supply agreement.

Another aspect of the framework is that each energy purchase transaction is automatically appended to the blockchain by the energy transmission company as a part of the settlement routine using the energy transmission company's key identity.

A further aspect of the framework is to provide a technique and a decision model to mine the blocks on the blockchain to identify the suppliers who are willful defaulters.

Referring to the Figures in more detail, and particularly referring to FIG. 1, there is illustrated an embodiment of a distributed peer-to-peer network 100 which includes a plurality of buyer nodes 102 and a plurality of supplier nodes 104. The peer-to-peer network 100 represents a computing environment for operating a decentralized framework that maintains a distributed data structure, which may be referred to herein as a secure distributed transaction ledger or a blockchain.

The peer-to-peer network 100 may be limited to only buyers, suppliers and utility regulators of the energy transmission market. That is, only buyers, suppliers and utility regulators of the energy transmission market may have access to the peer-to-peer network 100. Such a blockchain as shown and described herein may be called a permissioned blockchain.

The peer-to-peer network 100 may be managed by a peer-to-peer network manager 106 who may be a third party other than a buyer, seller or utility regulator.

The peer-to-peer network 100 may be accessed by computing devices 108 of buyers, seller and/or utility regulators.

Referring now FIG. 2, there are illustrated exemplary embodiments of a buyer node 102 and a supplier node 104 in the distributed peer-to-peer network 100. The buyer node 102 may include a central processing unit (CPU) 110 and memory 112. There may also be a communication device 114 for communicating with other nodes as well as communicating with computing devices 108, one of which may be a buyer computing device. The buyer node 102 may further include a storage medium 116 which may be physically located within the buyer node 102 or remotely accessible by the buyer node 102. Within storage medium 116, or accessible by storage medium 116, may be programs 118 including but not limited to a contract management system (CMS) 120, a supply chain management system 122 and smart contracts 124. Programs 118 may alternatively be within a computing device 108, one of which may be a buyer computing device, external to the peer-to-peer network 100.

The supplier node 104 may include a CPU 126 and memory 128. There may also be a communication device 130 for communicating with other nodes as well as communicating with computing devices 108, one of which may be a supplier computing device. The supplier node 104 may further include a storage medium 132 which may be physically located within the supplier node 104 or remotely accessible by the supplier node 104. Within storage medium 132, or accessible by storage medium 132, may be programs 134 including but not limited to a CMS 136 and a finance system 138. Programs 134 may alternatively be within a computing device 108, one of which may be a supplier computing device, external to the peer-to-peer network 100.

Figure 3:
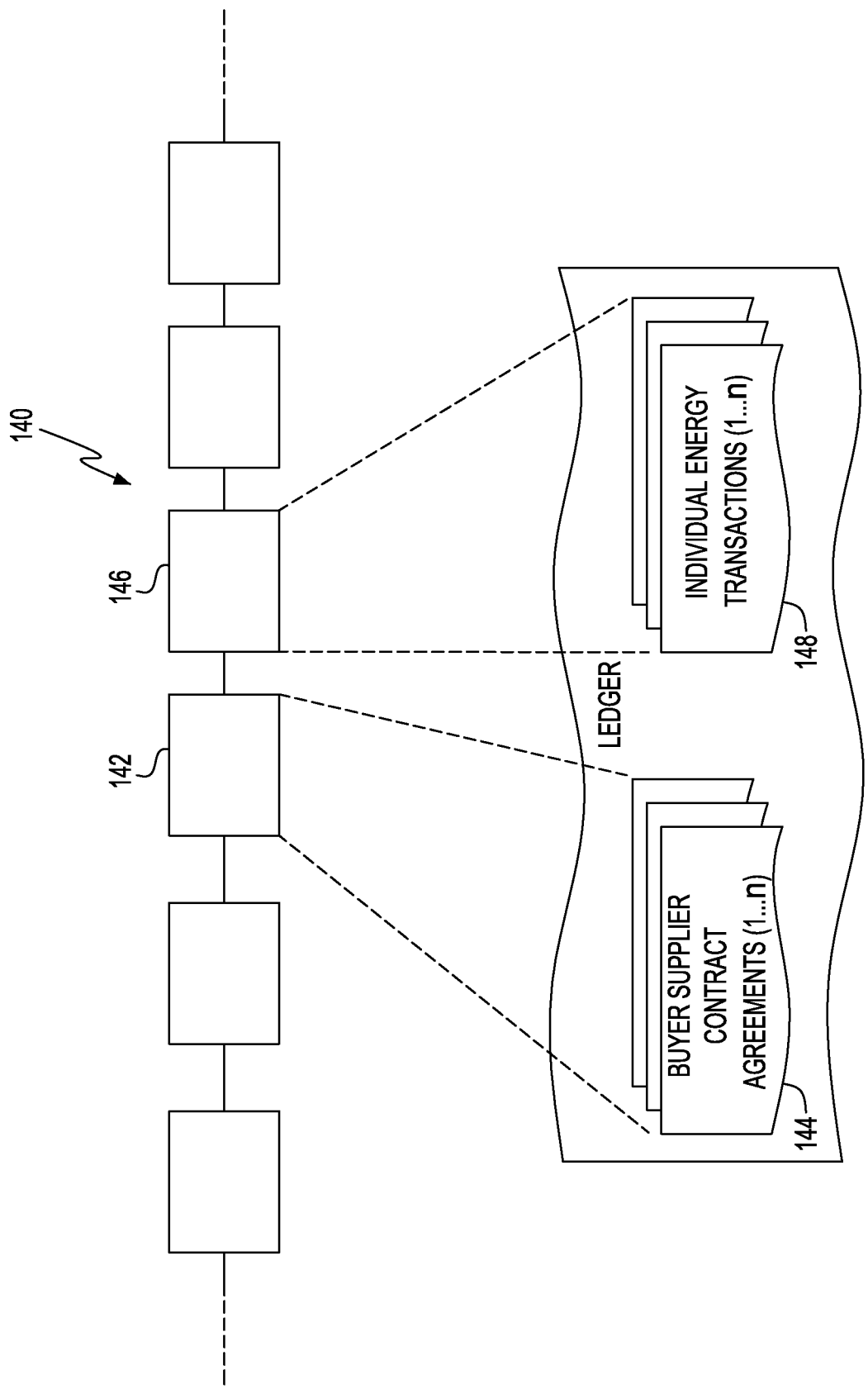
FIG. 3 illustrates a block chain that may be maintained by the nodes in the peer-to-peer network and in which blocks of the blockchain may contain one or more buyer-supplier contract agreements and blocks which may contain one or more individual energy transactions.

FIG. 3 illustrates a block chain 140 that may be maintained by the nodes in the peer-to-peer network 100. Blocks of the blockchain 140 may include one or more blocks 142 which may contain one or more buyer-supplier contract agreements 144 and one or more blocks 146 which may contain one or more individual energy transactions 148. The buyer-supplier contract agreements 144 may contain the terms and conditions under which an energy supplier may agree to supply a quantity of energy, for example a certain number of megawatts of electricity, to an energy transmission company. The individual energy transactions are each a physical energy quantity mentioned in the contract agreement to be transferred from the energy supplier to the energy transmission company as per the contract agreement and to be settled through a settlement routine. The contract agreement contained the planned physical transfers of energy from the energy supplier to the energy transmission company and not the actual transfers that happens from energy supplier to the energy transmission company in real time and as documented as individual energy transactions.

"Settled through a settlement routine" means that the energy supplier has supplied a quantity of energy to the energy transmission company, the energy transmission company has acknowledged receipt of the quantity of energy and has authorized payment to the energy supplier. Such purchases of energy by the energy transmission company may occur each day and the purchase and payment for the energy may be settled at the end of the business day for each purchase and transfer of energy.

Figure 4:
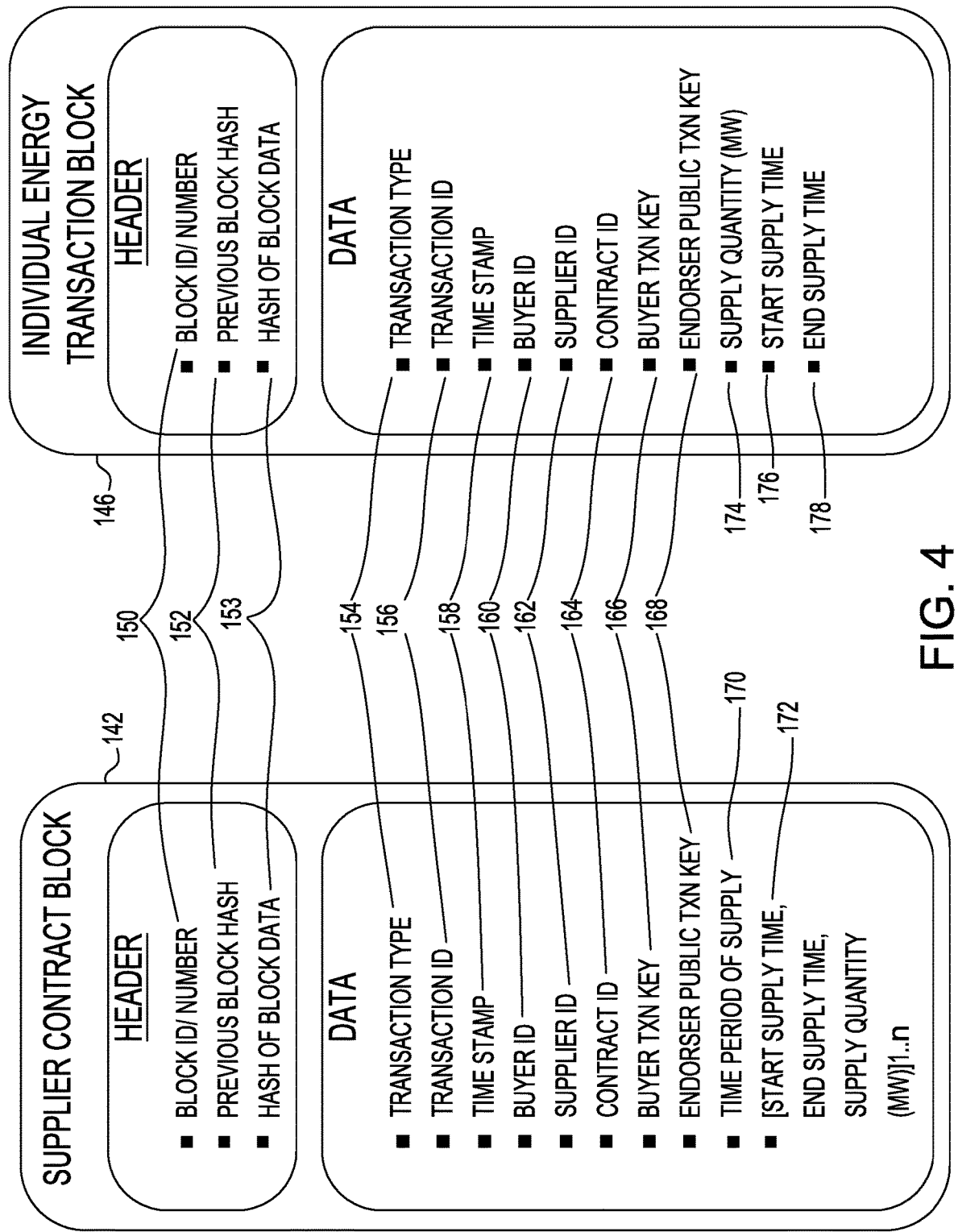
FIG. 4 illustrates the buyer-supplier contract block and the individual energy transactions block in more detail.

Referring now to FIG. 4, the buyer-supplier contract block 142 and the individual energy transactions block 146. These two types of blocks have common details but also some differences.

Figure 5:
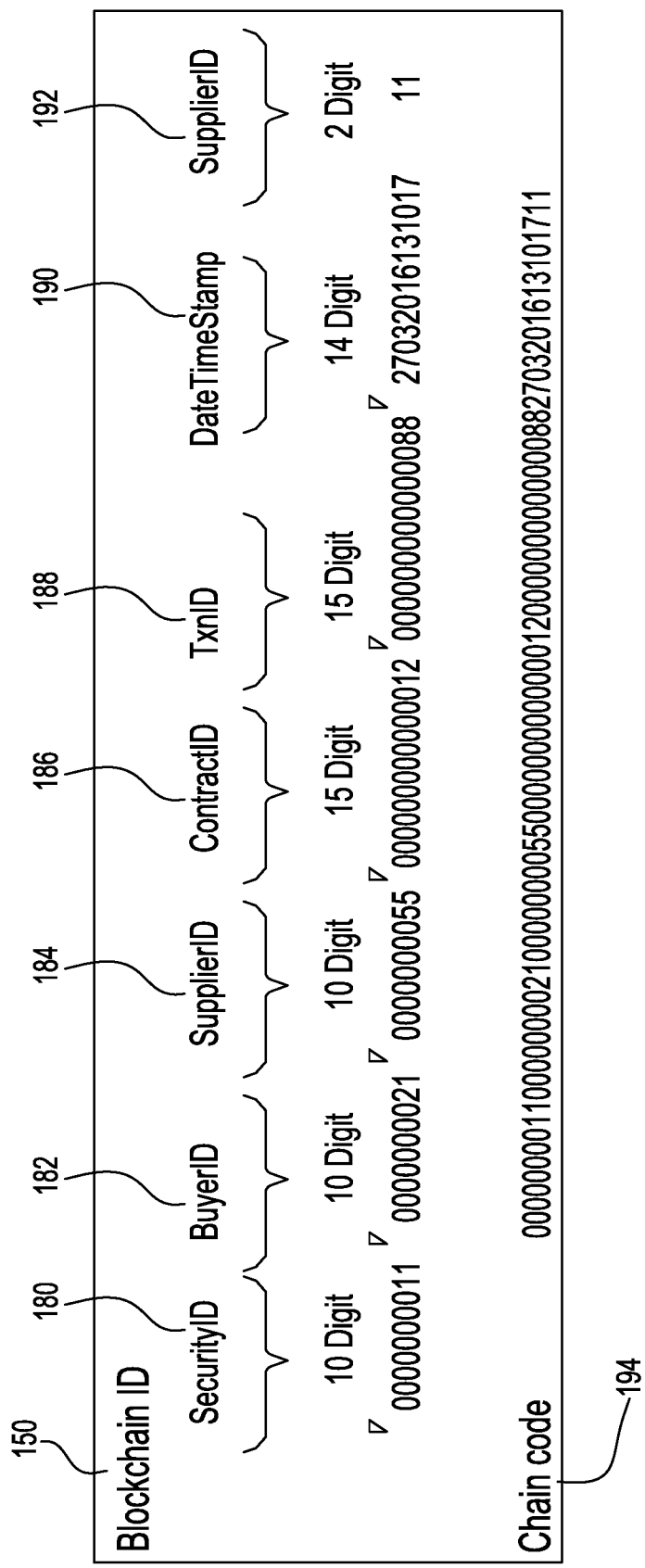
FIG. 5 illustrates in more detail the Block Id/Number that is part of the buyer-supplier contract block and the individual energy transactions block illustrated in FIG. 4.

First, the common details of the two types of blocks will be described. Each of the blocks has a Block Id/Number 150 in the header which is a block unique identifier in the block chain. The Block Id/Number 150 is described in more detail with respect to FIG. 5. The Block Id/Number 150 actually contains digits representing data that is contained in the body of the buyer-supplier contract block 142 and the individual energy transactions block 146. Thus, Block Id/Number 150 contains digits representing a security identifier 180, a buyer identifier 182, a supplier identifier 184, a contract identifier 186, a transaction identifier 188, a date/time stamp 190 and a transaction type 192. When all of the components of the Block Id/Number 150 are put together, the Block Id/Number 150 appears as a chain code 194. The digits shown in FIG. 5 are for the purpose of illustration and not limitation.

Returning back to FIG. 4, the buyer-supplier contract block 142 and the individual energy transactions block 146 contain a Previous Block Hash 152 which is a hash value of the previous block for historical traceability of block and a Hash of Block Data 153 which is a hash value of block data.

The Transaction Type 154 is the type of transaction the block represents, for example, the buyer-supplier contract or the individual energy transaction. The Transaction Id 156 is the transaction Identifier within the Transaction Type 154.

The Time Stamp 158 is a time stamp when the block is committed to the block chain.

The Buyer Id 160 is a unique Identifier for the buyer while the Supplier Id 162 is a unique identifier for the supplier.

The Contract Id 164 is a contract identifier as referred to in the buyer-supplier contract agreement between buyer and supplier and may be obtained from the buyer's CMS.

The Endorser's Public Txn key 168 is an endorser's public security key with which buyer encrypts the buyer-supplier contract agreement block 142 and individual energy transaction block 146. An endorser may be any other energy buyer who participates in the blockchain.

The following details may appear only in the buyer-supplier contract block 142 and the individual energy transactions block 146.

The Time period of Supply 170 in the buyer-supplier contract block 142 is the time period of supply for bulk energy as referred to in the buyer-supplier contract between buyer and supplier in buyer's CMS.

Also included only in the buyer-supplier contract block 142 is the [Start Supply time, End Supply time, Supply Quantity (MW)]1 . . . n 172 which sets forth the details for the set of Individual energy transactions as planned in the buyer-supplier contract between buyer and supplier in buyer's CMS. Within the contracted bulk energy purchase between the energy transmission company and the energy supplier, the energy supplier in reality transfers multiple chunks of energy quantity in different time periods on a day to day to basis which are inside the contract time periods. So each chunk of each physical energy transfer in a particular time period is denoted as [Start Supply time, End Supply time, Supply Quantity (MW)]. And there can be many such chunks of physical energy transfers denoted by [Start Supply time, End Supply time, Supply Quantity (MW)1, [Start Supply time, End Supply time, Supply Quantity (MW)2 . . . to [Start Supply time, End Supply time, Supply Quantity (MW)n. The price per MW is not required to be included in the buyer-supplier contract block.

Only in the individual energy transactions block are the Supply Quantity (MW) 174 which is the quantity of individual energy supply/transaction in MW (megawatts), the Start Supply time 176 which is the start timestamp for each individual physical energy transfer as part of service fulfillment by the energy supplier, and the End Supply time 178 which is the end timestamp for individual physical energy transfer as part of service fulfillment by the supplier.

Figure 6:
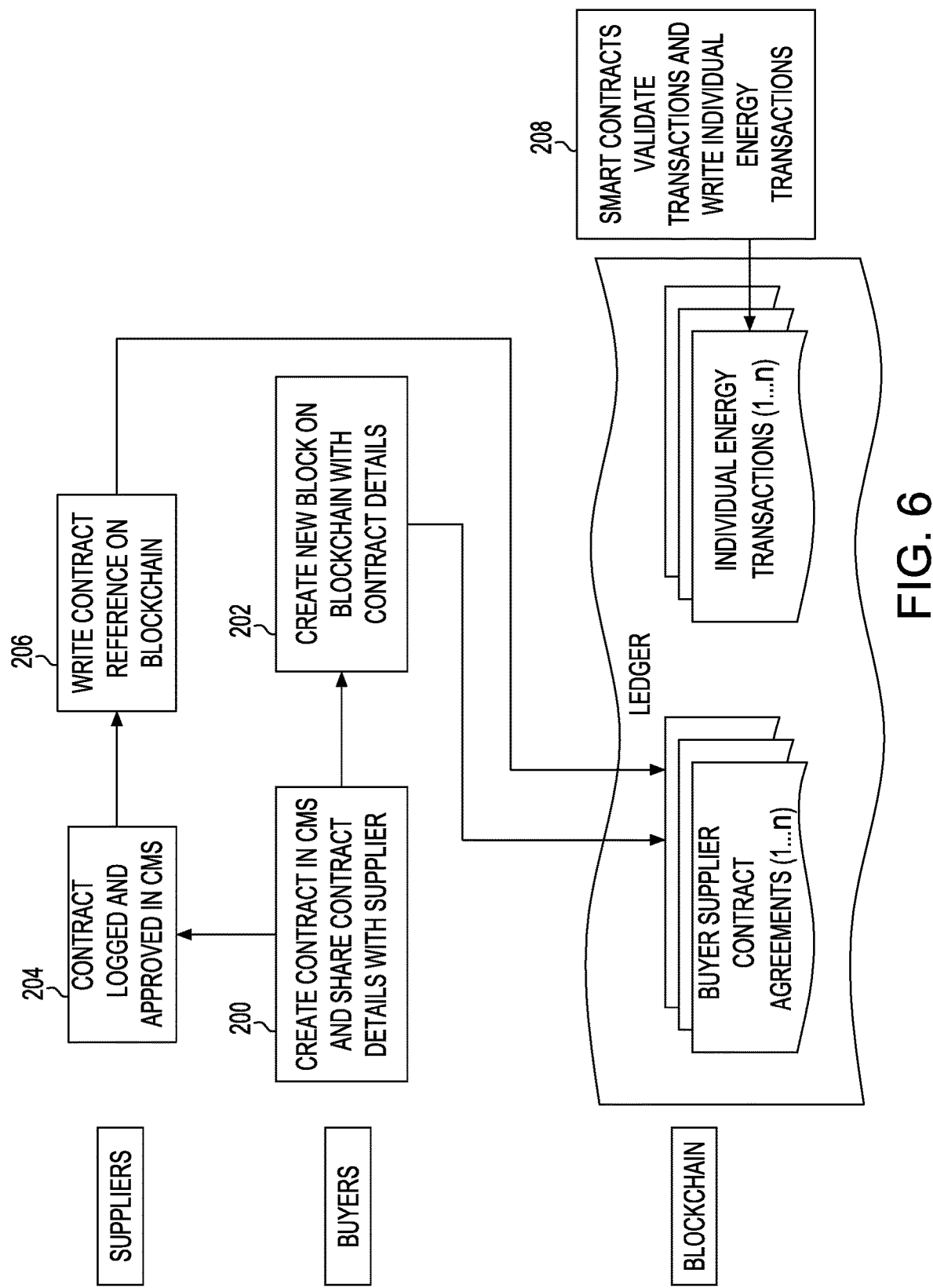
FIG. 6 illustrates a flow of transactions that may occur in the exemplary embodiments to add blocks to the blockchain.

Referring now to FIG. 6, there is illustrated a flow of transactions that may occur in the exemplary embodiments to add blocks to the blockchain 140. One set of transactions may be initiated by the buyer and another set of transactions may be initiated by the supplier and finally another may be initiated by a payment settlement routine.

The buyer may initially create a buyer-supplier contract in the buyer's CMS and share these contract details with the supplier, box 200. The buyer may also create a new block on the blockchain with the contract details, box 202. This new block is the buyer-supplier contact block 142 previously described in FIG. 4.

When the buyer shares the contract details with the supplier, the supplier may log the contract into the supplier's CMS, box 204. The supplier may also write the contract reference on the buyer-supplier contact block 142, box 206. The contract reference may be the supplier's security identification and the supplier's identifier.

Smart contracts validate the energy transactions when an energy supplier provides a quantity of energy to an energy transmission company with respect to the buyer-supplier contract block 142 and writes the transaction as an individual energy transaction block 146 in the secure distributed transaction ledger, box 208. This individual energy transaction block 146 may be written/triggered by a payment settlement routine by the energy transmission company through its supply chain management system after each individual physical energy transfer occurs.

Smart contracts are software program modules within the blockchain technical framework that enable the participant buyer nodes to create transactions as blocks to the blockchain and read or query the blockchain. Additionally, the smart contracts can, based on their ability to query the blockchain, validate if a transaction is legitimate to be added as a block to the blockchain. That is, before adding an individual energy transaction block, the smart contracts can validate if there is a valid buyer-supplier contract block available in the blockchain for a particular period of energy supply. The smart contracts are not tied to buyer-supplier contracts as smart contracts are a blockchain technical platform program deployed in all participant buyer nodes to work across all buyer-supplier contracts and individual energy transactions.

The individual energy transactions go through a settlement process to assure that the energy supplier gets paid by the energy transmission company for the purchase of energy supplied by the energy supplier to the energy transmission company. The settlement routine executes in the buyer's supply management system which is integrated to the supplier's finance system. The buyer's supply management system and the supplier's finance system may both be outside the blockchain framework. This settlement routine invokes the smart contract that writes the individual energy transaction block to the secure distributed transaction ledger as part of its program. The settlement with the energy supplier that may be done as a part of the physical receipt of energy by the energy transmission company for individual energy transactions and settlement as per the end of the day routine is not dependent on the proposed blockchain framework.

Having proposed the blockchain described previously, the energy transmission company may use analytics techniques to run a highlighter mining algorithm to expose the suppliers who had or have been willful defaulters, optimize the supplier mix by identifying the suppliers with uncommitted capacity and build dynamic pricing strategy for future agreements.

Other algorithms may also be used.

The following is an explanation of the highlighter mining algorithm.

Let the entire set of energy suppliers be $\{S\}$ A subset of the entire set of suppliers with valid purchase agreements in the given market conditions may be represented as $\{S\_n\}$ such that:

$$\{S\_n\} \in \{S\} \forall S\_n \rightarrow [S\_active=1] \qquad \text{Eq (1)}$$

Equation 1 above represents a subset of energy suppliers from the entire energy supplier list that have valid energy purchase contracts with the energy transmission companies. S_active denotes supplier has a valid energy contract.

The set of all energy transmission companies with valid identities on the blockchain is represented as $\{B\_n\}$. $\{B\_n\}$ is the set of all energy transmission companies who are participants in the blockchain.

Each transaction which is unique to B_n and S_n is defined as $\{T\_n\}$.

B_n is developed as the outer loop, and all the S_n as the inner loop to solve T_n for which transactions have the timestamp within the time for consideration. The objective of this step is to find a set of transactions between a specific start time and a specific end time to check if there are overlaps of transactions by an energy supplier with multiple buyers. So the mining and analytic on the blockchain will iterate through the blocks of energy transactions for each supplier in S_n as the inner loop and through each buyer B_n as the outer loop.

λ is all the transactions between buyer set B_n and supplier set S_n between the start and end time. For A transactions, we get:

The first passage through the S_n loop provides (n−1) comparisons. That is, for the first buyer in B_n and supplier in S_n set, there will be (n−1) comparisons for the transaction time, for example, B1 and S1, B1 and S2 . . . B1 and Sn.

The $(n-1)^{st}$ passage through the S_n loop adds one more comparison. Processing through all the buyers in B_n, for the last buyer, there will be only one comparison of transactions as other transactions would have already would have been compared with previous iterations.

All together: c ((n−1)+(n−2)+ . . . +1), :total (n−1)+(n−2)+ . . . +1 comparisons from above steps where c is the hashing required to do one comparison (hashing is required in the blockchain to append the previous block to every new block that is created), n is the times a key loads model that checks the inner loop condition and increment: 'n' iteration through energy suppliers in S_n subset for inner loop.

We also mine k times declaring blocks and initializing the chain. The blockchain mining analytics run k times to give a consistent results on initialization of each block in the blockchain.

B_n is then executed λ−1 times yielding us B_λ where B_λ represents the energy transmission companies who appear in A transactions.

Assume the overload of checking the loop links and decrementing i is c_load where overload is the processing load of hashing operation.

We then get loop consistency of θ. As there are two loops running, one inner and the other outer, as a part of the algorithm, loop consistency is defined as the strength of these two layered loops to be non-blocking so that the loop process doesn't get blocked and algorithm stops progressing.

Therefore the final wilful defaulters are represented as S_θ
where, $$\forall S\_\theta :: \{S\_active\} = \{S\_1 \ldots S\_r\} - \forall S\_k : \exists T\_n$$
$$\exists \{B\_n\} \cap \{S\_n\} \cap \{T\_n\} \text{ where } c \geq \theta\} \text{ and,}$$
$$\theta = \frac{1}{2}c(n^2-n)+c\_load(n-1)+k(\text{error}) \qquad \text{Eq (2)}$$

Equation 2 determines the set of active default energy suppliers by finding the multiple transactions by the energy supplier set S_θ who have energy transactions committed to more than one buyer within the start and end time with overlap of capacity commitments within the energy transmission company set B_n, Supplier Set S_n and Transaction set T_n.

Equation 2 yields the following query as represented by simple Structured Query Language (SQL) performed on a database:

Select Suppliers, price . . . .
FROM Blockchain, Contract Management systems
Where financial_txn_date<xxx and financial txn date>yyy
AND List of energy suppliers IN (All supplier in agreement with buyer in CMS systems)
AND energy transmission company IN (All buyer (BuyID−BuyownID) on blockchain, excluding buyers own transactions)

For a given energy transmission company, the above query finds default energy suppliers within the start time and end time who have energy transactions resulting in overlap/double spread with other energy transmission companies excluding the energy transmission company's own transactions from the data and transactions available in the blockchain, and CMS. The above query just excludes the energy transmission company's own transactions with the energy supplier and not all transactions in the blockchain and CMS. The reason why the energy transmission company's own transactions with the energy supplier are excluded is because with this condition, the query will yield all the transactions between the energy suppliers and other energy transmission companies within the specific start and end time when the energy supplier(s) are contracted to provide energy to this particular energy transmission company at the same time resulting in overlap/double spread.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method of managing energy supply agreements comprising:
   connecting to a permissioned blockchain, the permissioned blockchain comprising blocks for energy purchase agreements and blocks for individual energy transactions and each being accessible only by energy suppliers, energy transmission companies and government agencies that regulate a market for the supply of energy by energy suppliers to energy transmission companies;

creating by an energy transmission company a new block for an energy purchase agreement that provides for the purchase of energy by the energy transmission company from an energy supplier;

appending by the energy transmission company the new block having the energy purchase agreement to the blockchain; and responsive to the energy supplier supplying a quantity of energy to the energy transmission company in an individual energy transaction, appending the individual energy transaction as a block to the blockchain; and mining the blocks of the blockchain to identify energy suppliers who default on a contractually-agreed commitment to supply a quantity of energy to one or more energy transmission companies other than the energy transmission company wherein the mining is by an algorithm that determines a set of active default energy suppliers on the blockchain by finding multiple transactions by an energy supplier set $S\_\theta$ who have energy transactions committed to more than one energy transmission company within a predetermined start and end time with overlap of capacity commitments within a set of energy transmission companies $B\_n$, a set of energy suppliers having valid purchase agreements on the blockchain $S\_n$ and a set of energy transactions $T\_n$ between $B\_n$ and $S\_n$.

2. The computer-implemented method of claim 1 wherein transaction data including energy transmission company identification, energy supplier identification and capacity of the energy supplier is available to all of the energy suppliers, energy transmission companies and government agencies who have access to the permissioned blockchain.

3. The computer-implemented method of claim 2 wherein transaction data including a quantity of energy to be supplied and at what intervals are only available to the government agencies and to the energy supplier and energy transmission company who are parties to the energy purchase agreement.

4. The computer-implemented method of claim 1 wherein appending the individual energy transaction comprising validating the individual energy transaction by a smart contract within a technical framework of the blockchain and writing the individual energy transaction as a block to the blockchain.

5. The computer-implemented method of claim 4 further comprising executing a settlement routine including invoking the smart contract and paying the energy supplier for the quantity of energy.

6. A computer program product for managing energy supply agreements comprising a non-transitory computer readable storage medium having program instructions embodied therewith, the program instructions executable by a computer to cause the computer to perform a method comprising:

connecting to a permissioned blockchain, the permissioned blockchain comprising blocks for energy purchase agreements and blocks for individual energy transactions and each being accessible only by energy suppliers, energy transmission companies and government agencies that regulate a market for the supply of energy by energy suppliers to energy transmission companies;

creating a new block for an energy purchase agreement that provides for the purchase of energy by an energy transmission company from an energy supplier;

appending the new block having the energy purchase agreement to the blockchain;

responsive to the energy supplier supplying a quantity of energy to the energy transmission company in an individual energy transaction, appending the individual energy transaction as a block to the blockchain; and mining the blocks of the blockchain to identify energy suppliers who default on a contractually-agreed commitment to supply a quantity of energy to one or more energy transmission companies other than the energy transmission company wherein the mining is by an algorithm that determines a set of active default energy suppliers on the blockchain by finding multiple transactions by an energy supplier set $S\_\theta$ who have energy transactions committed to more than one energy transmission company within a predetermined start and end time with overlap of capacity commitments within a set of energy transmission companies $B\_n$, a set of energy suppliers having valid purchase agreements on the blockchain $S\_n$ and a set of energy transactions $T\_n$ between $B\_n$ and $S\_n$.

7. The computer program product of claim 6 wherein transaction data including energy transmission company identification, energy supplier identification and capacity of the energy supplier is available to all of the energy suppliers, energy transmission companies and government agencies who have access to the permissioned blockchain.

8. The computer program product of claim 7 wherein transaction data including a quantity of energy to be supplied and at what intervals are only available to the government agencies and to the energy supplier and energy transmission company who are parties to the energy purchase agreement.

9. The computer program product of claim 6 wherein appending the individual energy transaction comprising validating the individual energy transaction by a smart contract within a technical framework of the blockchain and writing the individual energy transaction as a block to the blockchain.

10. The computer program product of claim 9 further comprising executing a settlement routine including invoking the smart contract and paying the energy supplier for the quantity of energy.

11. A system for managing energy supply agreements comprising:

a permissioned blockchain, the permissioned blockchain comprising blocks for energy purchase agreements and blocks for individual energy transactions and each being accessible only by energy suppliers, energy transmission companies and government agencies that regulate a market for the supply of energy by energy suppliers to energy transmission companies;

a non-transitory storage medium that stores instructions;

a computer that executes the instructions to perform the following functions:

create a new block for an energy purchase agreement that provides for the purchase of energy by an energy transmission company from an energy supplier;

append the new block having the energy purchase agreement to the blockchain;

responsive to the energy suppliers supply of a quantity of energy to the energy transmission company in an individual energy transaction, append the individual energy transaction as a block to the blockchain; and mine the blocks of the blockchain to identify energy suppliers who default on a contractually-agreed commitment to supply a quantity of energy to one or more energy transmission companies other than the energy transmission company wherein mine the blocks of the blockchain is by an algorithm that determines a set of active default energy suppliers on the blockchain by finding multiple transactions by an energy supplier set $S\_\theta$ who have energy transactions committed to more than one energy transmission company within a predetermined start and end time with overlap of capacity commitments within a set of energy transmission companies $B\_n$, a set of energy suppliers having valid purchase agreements on the blockchain $S\_n$ and a set of energy transactions $T\_n$ between $B\_n$ and $S\_n$.

12. The system of claim 11 wherein transaction data including energy transmission company identification, energy supplier identification and capacity of the energy supplier is available to all of the energy suppliers, energy transmission companies and government agencies who have access to the permissioned blockchain.

13. The system of claim 11 wherein append the individual energy transaction comprises validate the individual energy transaction by a smart contract within a technical framework of the blockchain and write the individual energy transaction as a block to the blockchain.

14. The system of claim 13 further comprises execute a settlement routine including invoke the smart contract and pay the energy supplier for the quantity of energy.

* * * * *